Patented Oct. 17, 1933

1,931,196

UNITED STATES PATENT OFFICE 1,931,196

VAT DYESTUFFS

Georg Kalischer, Frankfort-on-the-Main, Heinrich Ritter, Frankfort-on-the-Main-Fechenheim, and Fritz Baumann, Leverkusen-on-the-Rhine, Germany, assignors to General Aniline Works, Inc., New York, N. Y., a corporation of Delaware No Drawing. Application October 24, 1930, Serial No. 491,074, and in Germany October 30, 1929

6 Claims. (Cl. 260—53)

Our present invention relates to new dyestuffs capable of being vatted.

The new dyestuffs are obtained by condensing a thiophenanthrone-carboxylic acid halide corresponding probably to the formula:

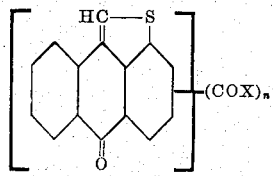

wherein X means halogen and $n$ the number 1 or 2, with a cyclic ketone compound containing at least one free amino-group, which ketone is capable of being vatted and may itself be a dyestuff.

The thiophenanthrone-carboxylic acid halides are prepared in the customary manner by starting from the corresponding thiophenanthrone-carboxylic acids. Among the latter compounds the thiophenanthrone-2-carboxylic acid is obtainable for instance by briefly heating a weakly alkaline solution of 1.2-anthraquinone-thioglycollic-carboxylic acid to boiling, whereas by heating a stronger alkaline solution thereof for a longer time the C-carboxy-thiophenanthrone-2-carboxylic acid of the probable formula:

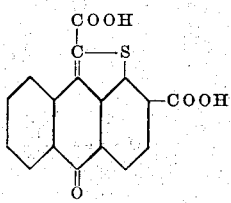

can be isolated.

The thiophenanthrone-3-carboxylic acid is obtainable by converting anthraquinone-1-amino-3-carboxylic acid through the thiocyanate into anthraquinone-1-thioglycollic-3-carboxylic acid, which latter compound yields by heating with acetic anhydride to about 160° C. with loss of carbon dioxide the thiophenanthrone-3-carboxylic acid. This acid crystallizes from nitrobenzene in beautiful needles, which dissolves in sulfuric acid with an orange coloration exhibiting a yellowish green fluorescence. Its chloride melts at about 256° C.

In the same manner anthraquinone-1-amino-4-carboxylic acid can be transformed into thiophenanthrone-4-carboxylic acid. This latter compound dissolves in sulfuric acid with a red coloration and in alkaline water with an orange yellow coloration exhibiting a green fluorescence, which coloration is hardly changed by the addition of hydrosulfite.

As amino-derivatives of cyclic ketone compounds suitable for our present process of condensation α-mono- and diamino-anthraquinones, amino-anthramides and their carbazolic derivatives, amino-anthanthrones, amino-pyranthrones, amino-dibenzanthrones, amino-dibenzopyrenquinones, their substitution products and derivatives, amino-thiazolanthrone-sulfone and amino-coeramidonines may be mentioned, for example.

The condensation reaction is advantageously carried out in the presence of a suitable diluent such as mono- or dichlorobenzene or nitrobenzene with or without the addition of an acid binding agent.

The new dyestuffs of our present invention, which correspond probably to the general formula:

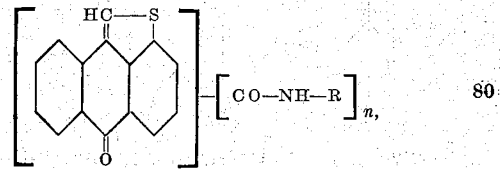

wherein $n$ means the number 1 or 2 and R the radical of a cyclic ketone, capable of being vatted, are valuable dyestuffs capable of being vatted and dyeing the vegetable fiber fast shades depending on the amine used for the condensation and ranging from yellow to violet. The new dyestuffs are distinguished by a good fastness to chlorine and washing and partially to light.

Particularly valuable are those dyestuffs obtained by condensation with α-amino-derivatives of the anthraquinone series and corresponding probably to the general formula:

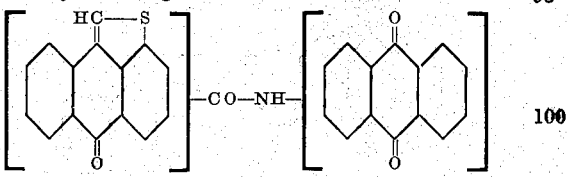

wherein the anthraquinone residue may contain a further aromatic acyl-amino-group.

In order to further illustrate our invention the following examples are given, the parts being by weight and all temperatures in centigrade degrees, but it is, however, to be understood, that our invention is not limited to the particular products nor reacting conditions mentioned therein.

Example 1

22 parts of 1-amino-anthraquinone are mixed with 29 parts of thiophenanthrone-2-carboxylic acid chloride (obtainable for instance by heating 30 parts of thiophenanthrone-2-carboxylic acid with 60 parts of thionylchloride with the addition of about 250 parts of trichlorobenzene) and with about 100 parts of monochlorobenzene and the mixture is heated to boiling until the evolution of hydrochloric acid has ceased. When cool the separated crystal mass is filtered off and dried. The new dyestuff corresponding to the probable formula:

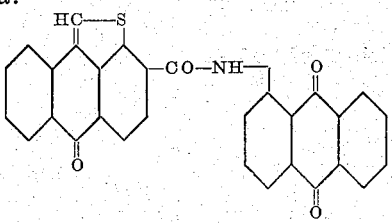

is thus obtained as yellow crystals which dye cotton from an orange-brown vat strong yellow shades of a good fastness. Its solution in concentrated sulfuric acid is brick-red colored.

Example 2

35 parts of 1-amino-5-benzoylamino-anthraquinone are mixed with 30 parts of thiophenanthrone-2-carboxylic acid chloride and about 350 parts of nitrobenzene and the mixture is heated to boiling, until the evolution of hydrochloric acid has ceased. When cool the separated pulp of orange crystals is filtered off and washed out with benzene. The new dyestuff corresponding to the probable formula:

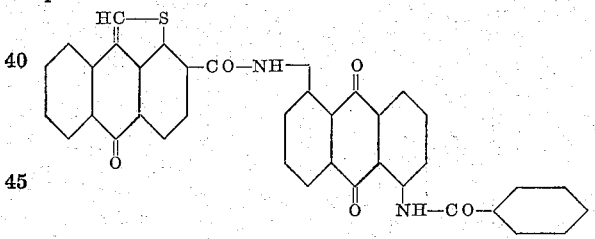

dissolves in concentrated sulfuric acid with a dark red color and dyes from a reddish brown vat cotton golden-yellow shades of a good fastness.

Example 3

When heating a mixture of 15 parts of thiophenanthrone-2-carboxylic acid chloride, of 17 parts of 1-amino-4-benzoylaminoanthraquinone and about 500 parts of nitrobenzene for some hours to boiling and working up the reaction mass as described in the foregoing examples the new dyestuff thus obtained corresponds to the probable formula:

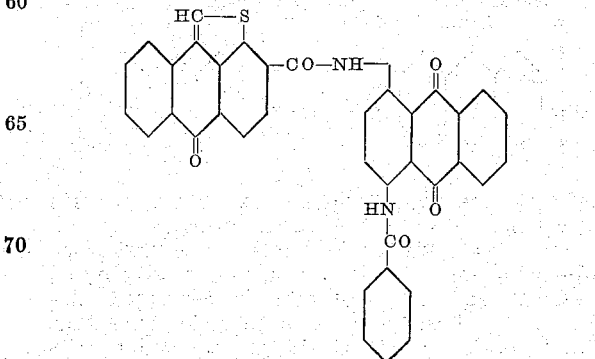

It forms brick-red crystals dyeing from a black-brown vat cotton orange shades. The solution in concentrated sulfuric acid is dark red colored.

Example 4

A mixture of 20 parts of amino-anthanthrone (obtained by reduction of the reaction product of nitric acid on an anthanthrone solution in nitrobenzene), 20 parts of thiophenanthrone-2-carboxylic acid chloride and about 150 parts of nitrobenzene and about 10 parts of anhydrous sodium acetate is heated for some hours to boiling. When cool the separated reddish brown crystals are filtered off and washed out with alcohol and water. The new dyestuff corresponding to the probable formula:

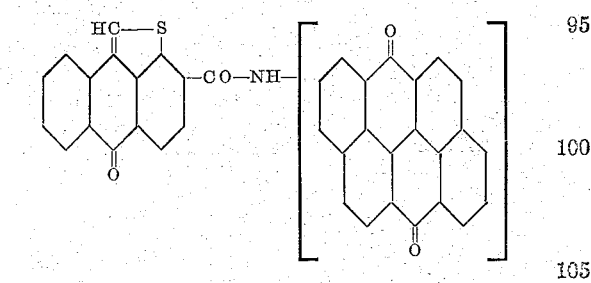

dyes cotton from a bright carmine red vat reddish brown shades. Its solution in sulfuric acid is dark blue colored.

Example 5

When heating a mixture of 15 parts of thiophenanthrone-2-carboxylic acid chloride, of 15 parts of 5-amino-anthraquinone-thiazolan-thronesulfone (cf. Berichte der deutschen chemischen Gesellschaft, vol. 52, page 557) and about 500 parts of nitrobenzene for some hours to boiling and working up the reaction mass as described in the foregoing examples the new dyestuff thus formed corresponds to the probable formula:

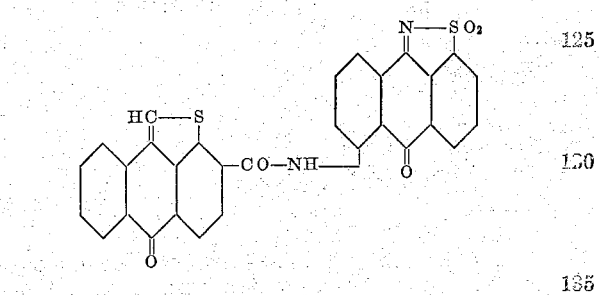

It dyes cotton from a dark olive-brown vat golden-yellow shades of a good fastness. The solution in concentrated sulfuric acid is red colored.

When condensing equimolecular proportions of amino-coeramidonine (which compound is obtainable by heating 1-amino-4-anilidoanthraquinone with anhydrous aluminium chloride and which compound represents a crystalline red substance being easily soluble in dilute acids, but being not vattable) and thiophenanthrone-2-carboxylic acid the new condensation product dyes cotton from a dark vat fast yellowish orange shades. It dissolves in concentrated sulfuric acid with a red color. It corresponds to the probable formula:

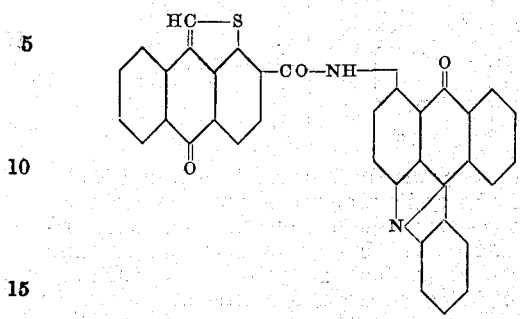

The condensation product of equimolecular proportions of thiophenanthrone-2-carboxylic acid chloride and aminopyranthrone (obtained by reducing the reaction product of fuming nitric acid on a nitrobenzene solution of pyranthrone), dyes cotton from a carmine red vat brown shades. Its solution in sulfuric acid is pure blue colored. The corresponding condensation product with aminoviolanthrone dyes cotton from a pure blue vat green shades, not turning to black when afterchlorinated. Its solution in sulfuric acid is violet-red. The corresponding condensation product with 5-amino-1.1'-dianthrimide dyes cotton from a reddish brown vat the same shades. Its solution in sulfuric acid is scarlet red colored. The condensation with amino-dibenzpyren-quinone yields a product dyeing cotton from a red vat yellow brown shades. The solution in sulfuric acid is intensely bluish red colored.

Example 6

20 parts of thiophenanthrone-3-carboxylic acid chloride are stirred for one hour at about 150–160° C. with 14 parts of 1-amino-anthraquinone in about 250 parts of anhydrous trichlorobenzene and finally heated for a short time to 200° C. After working up and drying the new dyestuff is a yellow crystalline powder, which dissolves in sulfuric acid with a red coloration and dyes cotton yellow from a reddish brown vat. It corresponds to the probable formula:

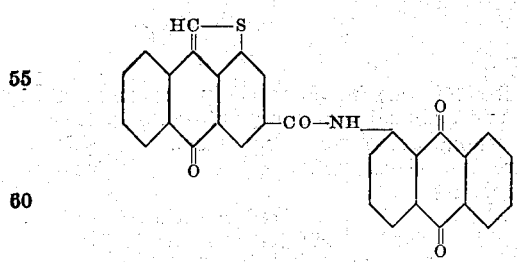

Example 7

56 parts of 5-amino-4'-benzoylamino-1.1'-anthrimidocarbazole and 35 parts of thiophenanthrone-4-carboxylic acid chloride are heated to about 200° C. in about 750 parts of nitrobenzene until no unchanged starting material can be detected. After cooling the product is filtered, washed with alcohol and dried. The new dyestuff, which crystallizes in brown needles, dissolves in sulfuric acid with a red coloration and dyes cotton brown from a brown vat. It corresponds to the probable formula:

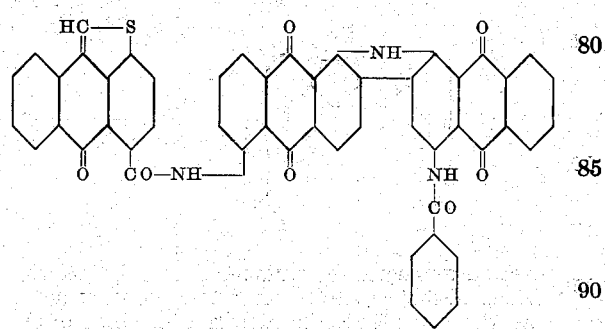

Example 8

C-carboxy-thiophenanthrone-2-carboxylic acid of the formula:

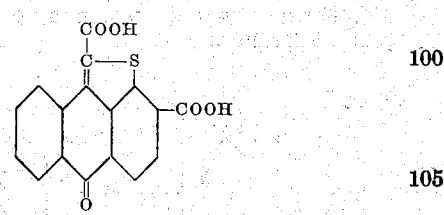

is converted by boiling in about 30 times the quantity of benzene with the calculated quantity of phosphorus penta-chloride into the dicarboxylic acid chloride (long rough prisms, melting at 202–208° C.).

20 parts of this dicarboxylic acid chloride are heated to 180–190° C. with 35 parts by weight of 1-amino-5-benzoylamino-anthraquinone in about 900 parts of trichloro-benzene until hydrochloric acid ceases to be evolved. The orange yellow dyestuff is filtered while still hot and dried. It can be purified if desired by boiling with quinoline, from which it is precipitated on cooling in beautiful crystals. It corresponds to the probable formula:

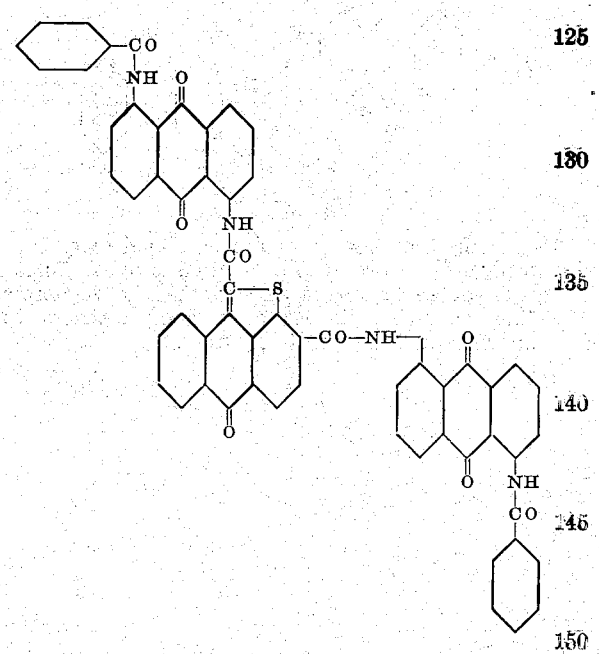

We claim:

1. Vat dyestuffs corresponding probably to the general formula:

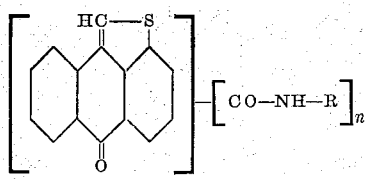

wherein $n$ means the number 1 or 2 and R the radical of a cyclic aromatic ketone, containing at least three condensed benzene nuclei, which products are valuable dyestuffs capable of being vatted and dyeing the vegetable fiber fast shades depending on the amine used for the condensation and ranging from yellow to violet, which dyestuffs are distinguished by a good fastness to chlorine and washing and partially to light.

2. Vat dyestuffs corresponding probably to the general formula:

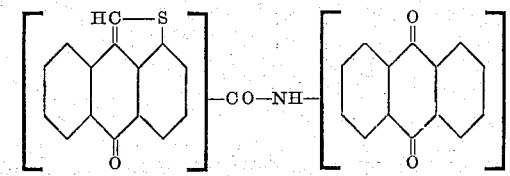

wherein the anthraquinone radical may contain a further aromatic acylamino-group, which products are valuable dyestuffs capable of being vatted and dyeing the vegetable fiber fast shades depending on the amine used for the condensation and ranging from yellow to brown, which dyestuffs are distinguished by a good fastness to chlorine and washing and partially to light.

3. Vat dyestuffs corresponding probably to the general formula:

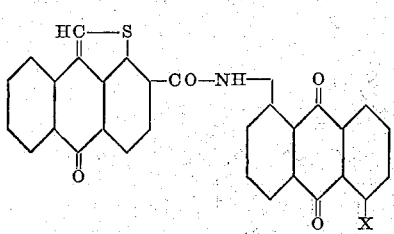

wherein X means hydrogen or a benzoylamino-group, which products are valuable dyestuffs capable of being vatted and dyeing the vegetable fiber yellowish shades of a good fastness to chlorine washing and to light.

4. Vat dyestuffs corresponding probably to the general formula:

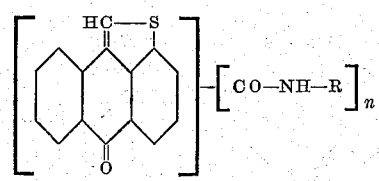

wherein $n$ means the number 1 or 2, and R the radical of a cyclic aromatic ketone containing at least three condensed benzene nuclei, said ketone being substituted by an aromatic acyl-amino group, which products are valuable dyestuffs capable of being vatted and dyeing the vegetable fiber fast shades depending on the amine used for the condensation and ranging from yellow to violet, which dyestuffs are distinguished by a good fastness to chlorine and washing and partially to light.

5. A vat dyestuff corresponding to the following probable formula:

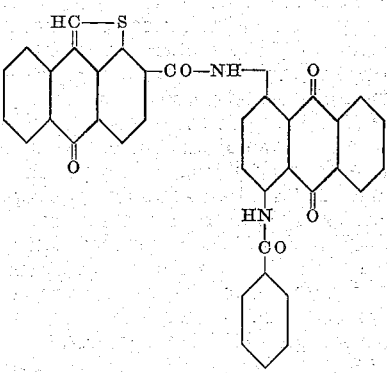

which product may be obtained in the form of brick-red crystals capable of being vatted and yielding a black-brown vat from which vegetable fibers are dyed orange shades of good fastness properties.

6. A vat dyestuff corresponding to the following probable formula:

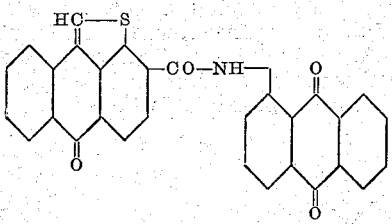

which product may be obtained in the form of yellow crystals capable of being vatted and yielding an orange-brown vat from which vegetable fibers are dyed strong yellow shades of good fastness properties.

GEORG KALISCHER.
HEINRICH RITTER.
FRITZ BAUMANN.

DISCLAIMER 1,931,196.—*Georg Kalischer*, Frankfort-on-the-Main, *Heinrich Ritter*, Frankfort-on-the-Main-Fechenheim, and *Fritz Baumann*, Leverkusen-on-the-Rhine, Germany. VAT DYESTUFFS. Patent dated October 17, 1933. Disclaimer filed August 27, 1935, by the assignee, *General Aniline Works, Inc.*

Hereby enters this disclaimer to certain of the claims of the above identified patent and Hereby disclaims claims 2, 3, 5, and 6.

Hereby disclaims from the scope of claims 1 and 4 those vat dyestuffs corresponding to the recited formulae, wherein "n" means the number 1.

[*Official Gazette September 24, 1935.*]